United States Patent
Agrawal et al.

(10) Patent No.: US 8,472,698 B2
(45) Date of Patent: *Jun. 25, 2013

(54) SYSTEM AND METHOD FOR DETERMINING POSES OF OBJECTS

(75) Inventors: Amit K. Agrawal, Somerville, MA (US); Changhua Wu, Troy, MI (US); Ramesh N. Raskar, Cambridge, MA (US); Jay Thornton, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 837 days.

This patent is subject to a terminal disclaimer.

(21) Appl. No.: 12/624,892

(22) Filed: Nov. 24, 2009

(65) Prior Publication Data

US 2011/0123122 A1    May 26, 2011

(51) Int. Cl.
*G06K 9/00* (2006.01)
*G06K 9/48* (2006.01)
*G06K 9/62* (2006.01)
*G06K 9/68* (2006.01)

(52) U.S. Cl.
USPC ............ 382/153; 382/199; 382/209; 382/218

(58) Field of Classification Search
USPC .............. 382/151, 153, 199, 209, 285, 291, 382/103, 203, 218
See application file for complete search history.

(56) References Cited

U.S. PATENT DOCUMENTS

| | | | |
|---|---|---|---|
| 7,206,449 B2 * | 4/2007 | Raskar et al. ............... | 382/199 |
| 7,940,960 B2 * | 5/2011 | Okada ......................... | 382/103 |
| 2008/0260238 A1 | 10/2008 | Pfister | |
| 2009/0116728 A1 | 5/2009 | Raskar | |

* cited by examiner

*Primary Examiner* — Daniel Mariam
(74) *Attorney, Agent, or Firm* — Dirk Brinkman; Gene Vinokur

(57) ABSTRACT

During pre-processing, a 3D model of the object is rendered for various poses by arranging virtual point light sources around the lens of a virtual camera. The shadows are used to obtain oriented depth edges of the object illuminated from multiple directions. The oriented depth edges are stored in a database. A camera acquires images of the scene by casting shadows onto the scene from different directions. The scene can include one or more objects arranged in arbitrary poses with respect to each other. The poses of the objects are determined by comparing the oriented depth edges obtained from the acquired images to the oriented depth edges stored in the database. The comparing evaluates, at each pixel, a cost function based on chamfer matching, which can be speed up using downhill simplex optimization.

13 Claims, 5 Drawing Sheets

SYSTEM AND METHOD FOR DETERMINING POSES OF OBJECTS

FIELD OF THE INVENTION

This invention relates generally to computer vision systems, and more particularly to systems for determining the pose of objects for robotic picking applications.

BACKGROUND OF THE INVENTION

Industrial robots repeat the same task with high accuracy and precision. In some industrial applications, such as manufacturing and assembly, robots pick parts (objects), and place the objects for subsequent processing. The robots require the pose of the objects. Any deviations can result in suboptimal performance, or even damage to the robotic arm or object.

Typically, custom designed mechanical and electro-mechanical systems are used to pick the objects with a known pose. In some applications, the objects are first sorted manually to facilitate the picking by the robot.

Robots can use computer vision techniques to determine the pose of the objects before the objects are picked. However, deployment of computer vision enabled robots continues to be limited because of numerous technical difficulties. Current systems can only pick a single non-occluding object from a bin of objects, or well separated objects. Systems have been designed to pick stacked objects, but the precise stacking of objects also needs a complex mechanical system, or human intervention.

Most computer vision systems lack reliability, accuracy and robustness and use expensive sensors and hardware. Current systems lack the capability of picking objects that are randomly arranged in a haphazard manner on top of each other in a pile or in a bin.

The problem of object picking is not new. Some systems use using electro-mechanical devices. Typically, the robot arm is equipped with a specially designed grasper for the object to be picked. However, the robot arm grasper needs to know the pose of the object to be picked. Methods such as precise positioning can be used to present the object in a specific pose to the robot arm. These systems are expensive, lack inter-operability because they need to be designed specifically for each object, and cannot handle objects randomly arranged in a bin.

Computer vision based systems typically use multiple cameras and illumination devices to analyze the scene and locate the object and to provide feedback to the robot arm for subsequent picking operations.

Most 2D computer vision systems can locate the in-plane orientation and location of objects object but cannot determine the out of plane rotation and distance to the object. Typically, those systems require objects to be non-overlapping and placed on a flat surface. Thus, those systems cannot operate on random pile of objects, or a bin of objects.

Some computer vision systems augment the 2D vision system by also calculating the distance to the object from changes in the size of the object in images. However, those systems cannot determine the out of plane rotation, and are often unreliable in their depth estimate. 3D computer vision systems typically use sensors for determining the 3D geometry of the scene.

Stereo vision systems use two cameras to determine the depth of the object. Corresponding features are localized in the images acquired by the two cameras, and the geometric relationship between the cameras can be use to identify the depth of feature points. However, finding corresponding features is a challenging problem, especially for machine objects, which are often shiny and have a homogeneous featureless texture. In addition, stereo vision systems have a high degree of sensitivity to noise during feature localization. Another problem with stereo systems is that the depths are only recovered at the feature points, and not for the entire object. The reduced accuracy can be tolerated for certain applications such as unracking large body panels in body shops, but not for accurate bin picking of small objects with mirror like surfaces.

Laser triangulation uses structures light to generate a pattern on the surface of the object, which is imaged a camera, see U.S. application Ser. No. 11/738,642, "Method and System for Determining Objects Poses from Range Images," filed Apr. 23, 2007. The laser triangulation can recover a 3D point cloud on the object surface. That technology has been used for applications involving edge tracking for welding, sealing, glue deposition, grinding, waterjet cutting and deburring of flexible and dimensionally unstable objects. Laser based systems require registration and accounting for shadows and occlusions. Laser systems have not been commercialized successfully for general random bin picking. In addition, the use of lasers also leads to safety issues when deployed in close proximity of operators.

U.S. patent application Ser. No. 11/936,416 "Method and System for Locating and Picking Objects Using Active Illumination," file Nov. 7, 2007, by Ramesh Raskar et al., describes a bin picking system that connects depth edges to form contours, and then uses an occlusion graph to match the contours to obtain the pose. However, that system only tries to find unoccluded objects in the scene and has difficulties when a large portion of the object is occluded. That system also requires an additional segmentation step, which can itself be prone to error.

SUMMARY OF THE INVENTION

During pre-processing, a 3D model of the object is rendered for various poses by arranging virtual point light sources around the lens of a virtual camera. The shadows are used to obtain oriented depth edges of the object illuminated from multiple directions. The oriented depth edges are stored in a database.

During operation, a camera acquires images of the scene by casting shadows onto the scene from different directions. The scene can include one or more objects arranged in arbitrary poses with respect to each other.

The poses of the objects are determined by comparing the oriented depth edges obtained from the acquired images to the oriented depth edges stored in the database. The comparing evaluates, at each pixel, a cost function based on chamfer matching, which can be speed up using downhill simplex optimization.

DETAILED DESCRIPTION OF THE PREFERRED EMBODIMENT

Pre-Processing

Figure 1:
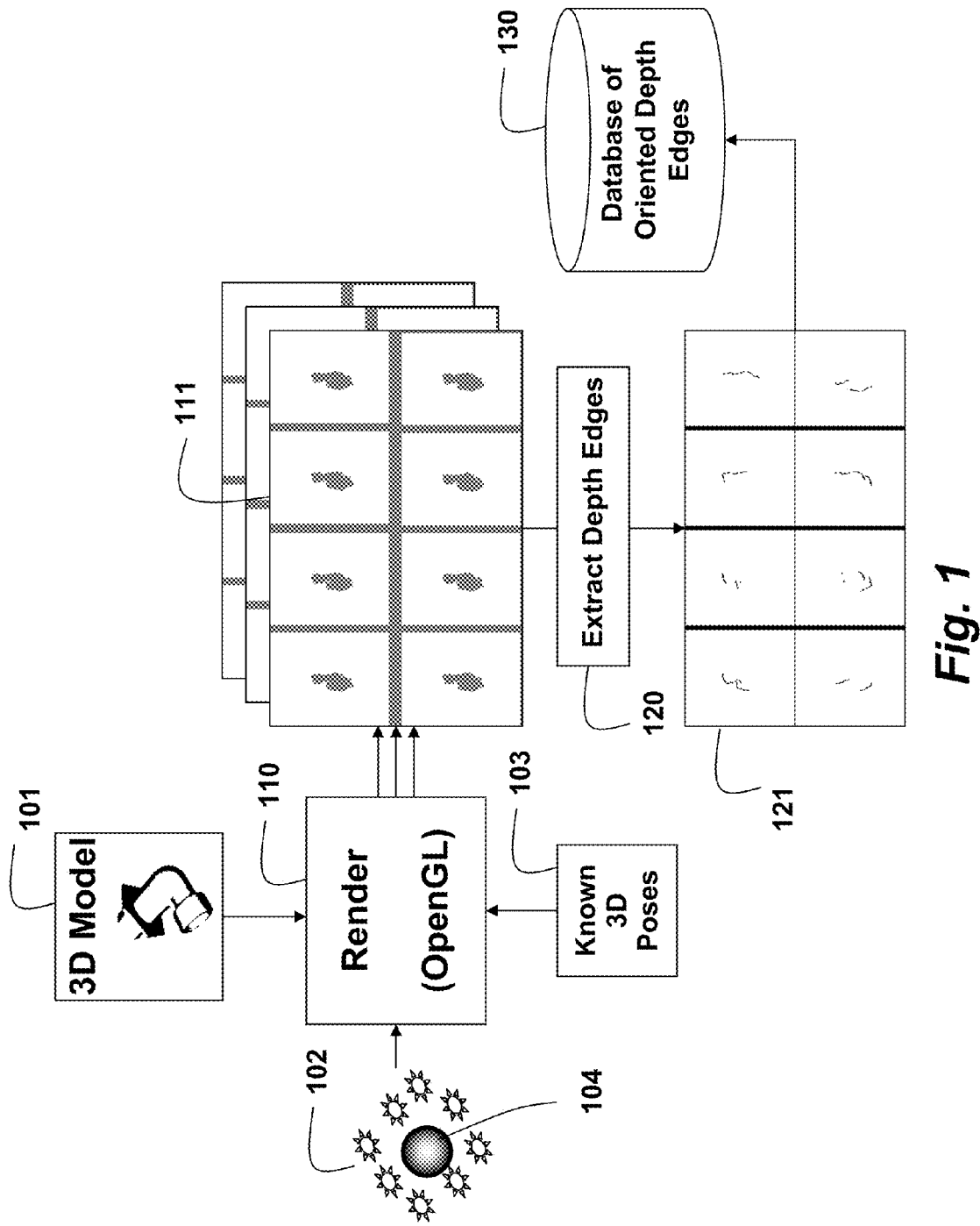
FIG. 1 is a schematic of a pre-processing procedure for object pose determination according to embodiments of the invention.

FIG. 1 show a pre-processing procedure for determining 3D poses of objects according to embodiments of our invention. The procedure can be performed in a processor including a memory, and input/output interfaces as known in the art. The pose includes the x, y, z translational location and the θ, φ, Φ angular orientation. The method can be performed for various types of objects to construct a database used during actual operation of the method, also performed in a processor.

A rendering engine 110 (OpenGL) generates sets of virtual images 111 of a 3D model 101 of the object using a virtual camera. Each set is for a different possible known pose 101 of the model. The model is illuminated by a set of (eight) virtual point light sources 102 arranged around a lens 104 of the virtual camera. Therefore, there are eight virtual images in each set 111 for each known pose 103.

Virtual depth image edges 121 are constructed 120 from the set of virtual images as described below, and stored in a database 130. The database can store virtual depth edges for various types of objects and poses. Thus, when different objects are commingled, the various poses of the different objects can be determined.

Figure 2A:
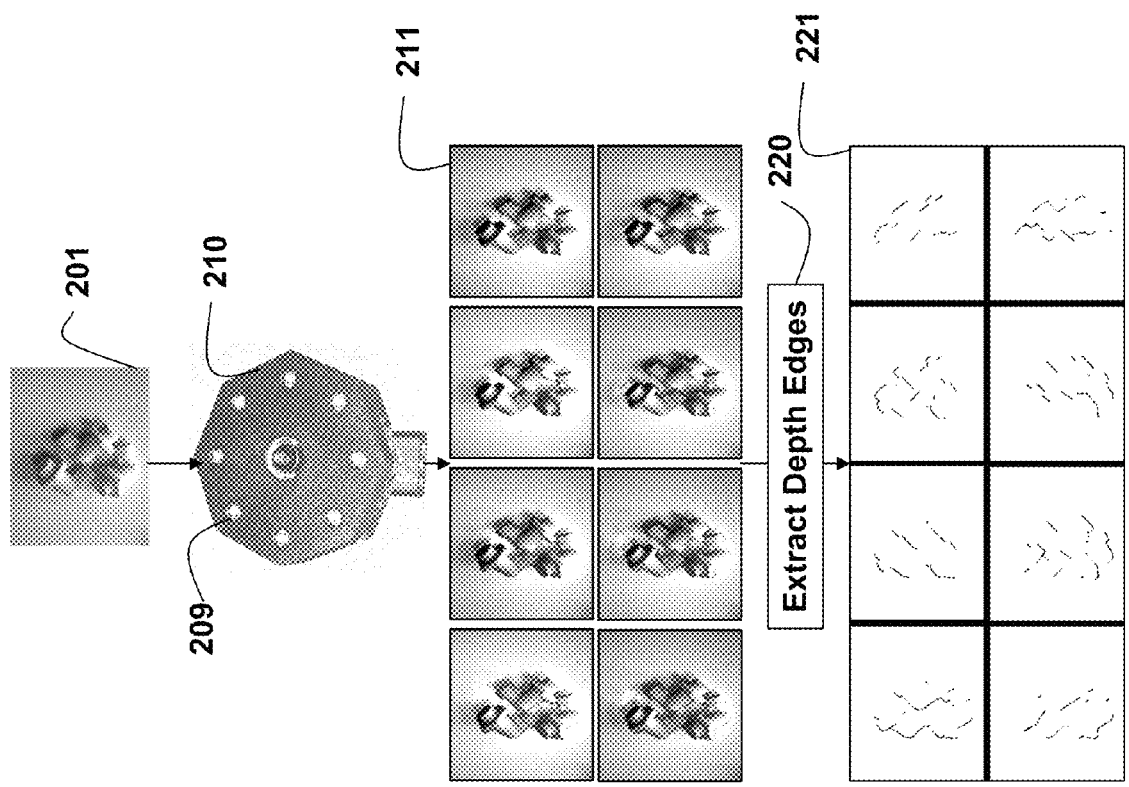
FIG. 2A is a schematic of a method for object pose determination according to embodiments of the invention.

As shown in FIG. 2A, a camera 210 acquires a set of real images $I_i$ 211 of a scene 210 including multiple objects. The objects can be different. The cameras can be a video camera or a still photo camera. The objects can be randomly arranged in the scene, e.g., commingled in a bin. The camera includes a set of (eight) real point light sources 109 around the lens. The light sources can be high intensity LEDs. Thus, a set of eight real images is acquired. The number and locations of the virtual lights correspond to the number and locations of the real light. Because the illumination is from different directions, shadows cast by the object have different orientations, which will correspond to depth edges of the object.

If the scene is illuminated by ambient light, a real image with just the ambient light can also be acquired. This image can then be subtracted from each image in the set to cancel the effect of the ambient light.

Figure 2B:
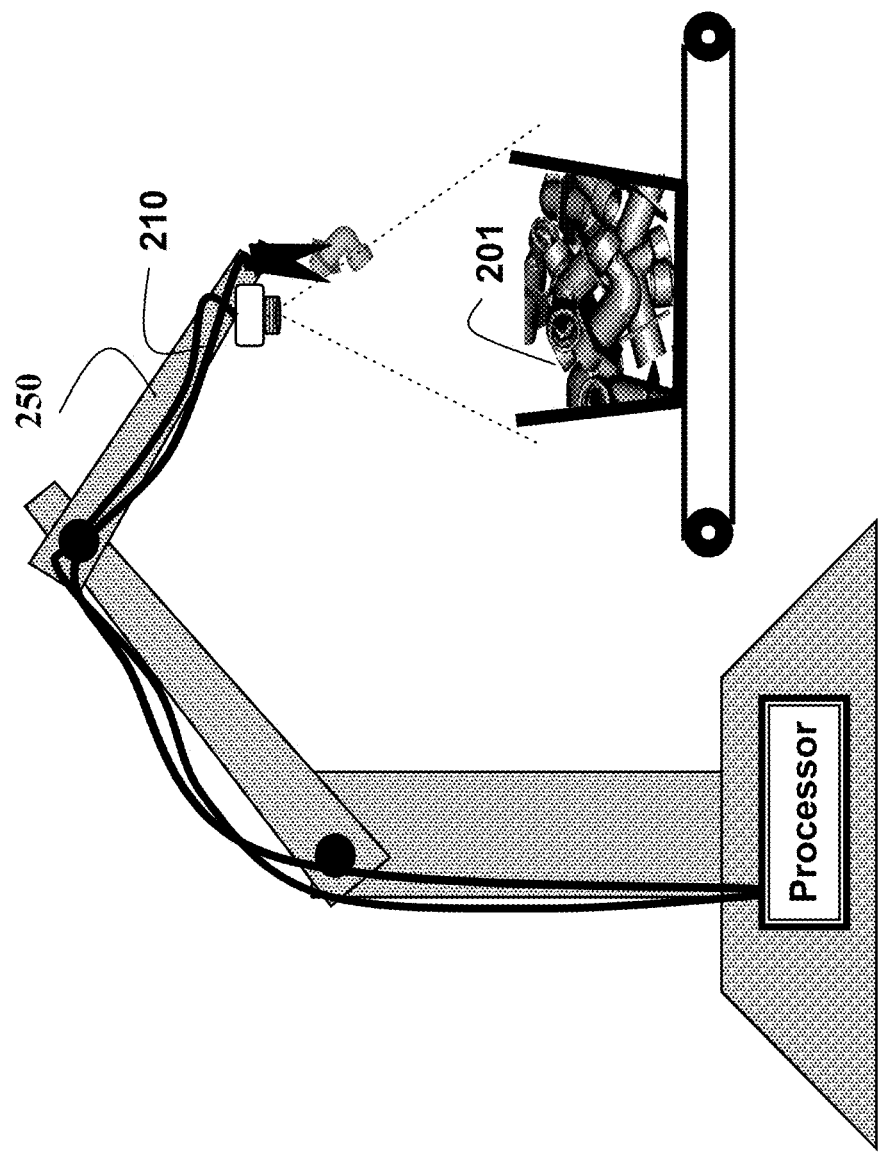
FIG. 2B is a schematic of object pose determination for a robot arm according to embodiments of the invention.

As shown in FIG. 2B, the camera can be arranged to the robot 250 arm, or can be fixed in workspace near the robot and the scene 201. Then, the robot arm can pick the object according to the known pose.

Constructing Oriented Depth Edge Images and Distance Transforms

A depth edge represents a discontinuity between a boundary of the object and the background.

Figure 4:
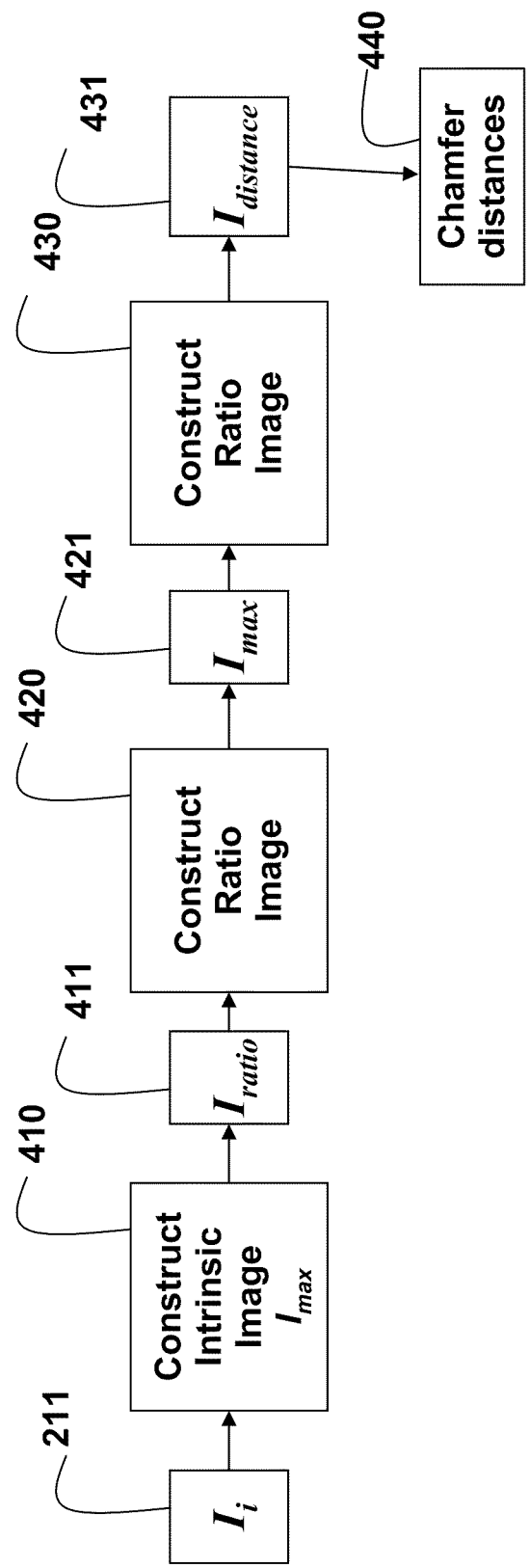
FIG. 4 is a block diagram of a process for determining chamfer distances according to embodiments of the invention.

As shown in FIG. 4, the depth edges are obtained by first constructing 410 an intrinsic image $I_{max}$ 411. Each pixel in the intrinsic image stores a maximum intensity selected from corresponding pixels at the same location in all of the images $I_i$ 211 in the set. Then, a ratio images $I_{ratio}$ 421 is constructed 420 as $$\frac{I_i}{I_{max}}.$$

Edges in the ratio images 321 correspond to the oriented depth edges. The orientation of the depth edges depend on the direction of the illumination for that image, which is different for each image $I_i$ in the set.

A distance image $I_{distance}$ 431 is constructed 430 from the ratio image. The distance image gives the distance to the nearest edge at every pixel in the image. The distance image is constructed for each image $I_i$ in the set 211.

We determine the distance transform image for every illumination direction for the database. Essentially, we match each of the eight edge images of the scene to each of the eight edge images of every pose in database and sum the costs. Then, the average distance gives the root mean square (RMS) chamfer distance 440.

$$\frac{1}{3}\sqrt{\frac{1}{n}\sum_{i=1}^{n} d_i^2},$$

where d is the distance value, and n the number of pixels considered. Chamfer matching of the distances images minimizes a generalized distance between the oriented depth edges in the virtual and real images.

Comparing chamfer distances is advantageous when there is substantial clutter, which will be the case when the images are of pile of randomly placed object, and when expected pose variations are well-represented in the database 130.

Comparing

Figure 3:
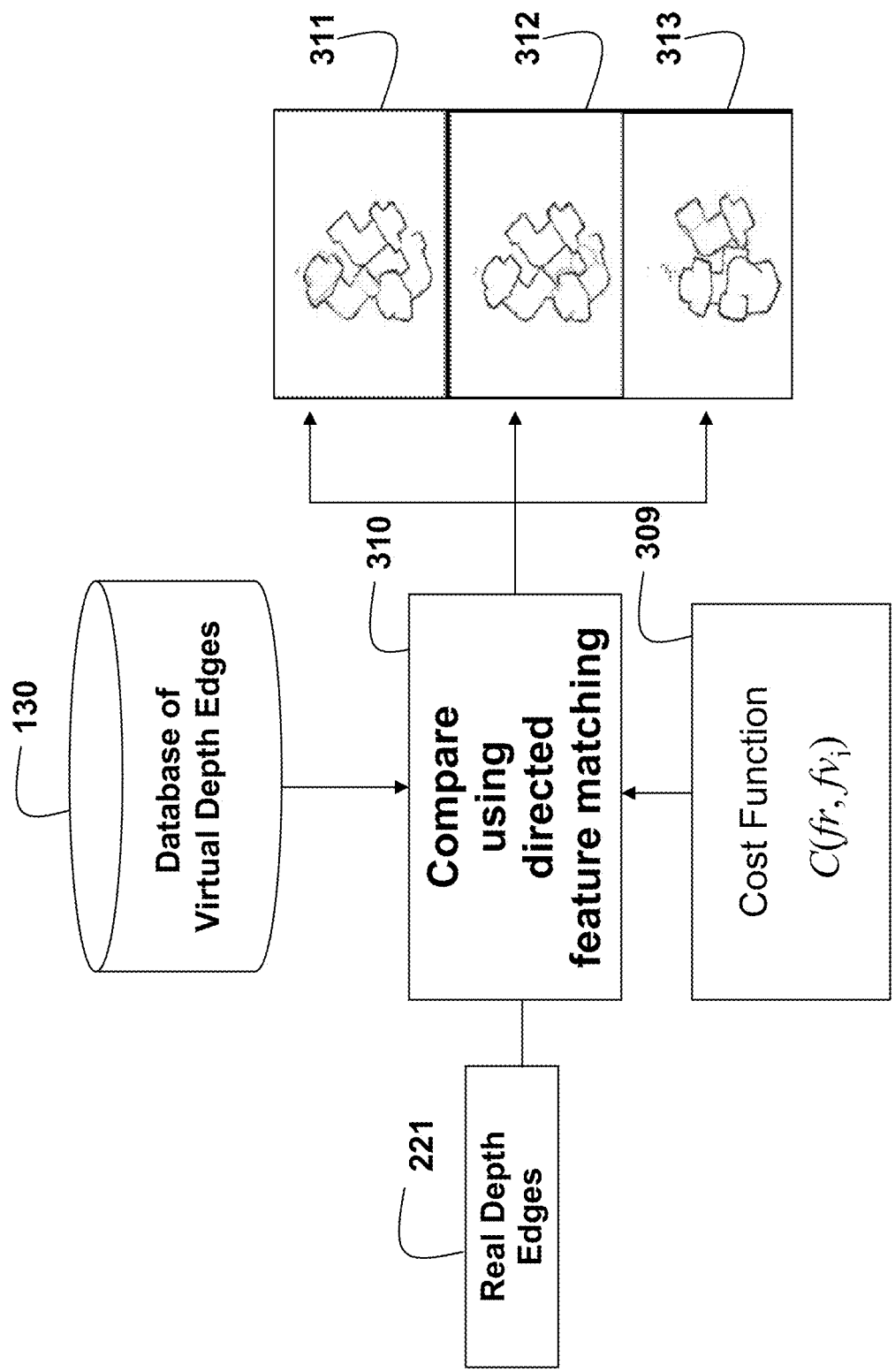
FIG. 3 is a schematic of a method for comparing object poses according to embodiments of the invention.

As shown in FIG. 3, the real oriented depth edges 211 are compared 310 with the virtual depth edges stored in the database 130 using the corresponding distance images, and a cost function 309 to determine possible poses 311-313, and the best matching known pose is selected as the pose of the object.

The pose has three translation parameters and three rotation parameters. The distance z from the object to the camera is known. First, the x-y translation is determined, and the three rotation parameters. This process can be repeated for different distances to determine the six pose parameters.

Determining Translation and Rotation Parameters

The method goes compares all possible poses in the database to find the best match for rotation angles and the location of the object. Let $d^p_i$ denote the distance transform of the $i^{th}$ oriented edge transform for the $p^{th}$ pose in the database. Let $d^s_i$ denote the distance transform of the $i^{th}$ oriented edge transform of the scene. For each pose p in the database, the matching cost for direction i for a pose p(x, y) is $$C_{i,p}(x, y) = \sum_{u=-Nx/2}^{u=Nx/2} \sum_{v=-Ny/2}^{v=Ny/2} d_i^p(u, v) \times d_i^s(x-u, y-v), \quad (1)$$

where Nx, Ny denote the size of the oriented depth edge for pose p in the database, u, v denote coordinates of the oriented depth edge for pose p in the database The total cost for a pose p(x, y) is the sum of all costs over all directions $$C_p(x, y) = \sum_i C_{i,p}(x, y), \quad (2)$$

The cost is evaluated for all poses p(x, y).

Downhill Simplex Optimization

The best pixel (x, y), and its associated cost $C_p(x, y)$ for every pose p in the database is determined using a downhill simplex procedure. The smallest costs, e.g., a hundred, and their corresponding pose parameters are retained. Theses costs are then classified based on their location to identify the objects and its corresponding pose.

Our method can be applied to multiple viewpoints to validate or improve the pose. Results from previous viewpoint can be used to guide the decision of next viewpoint.

Although the invention has been described by way of examples of preferred embodiments, it is to be understood that various other adaptations and modifications can be made within the spirit and scope of the invention. Therefore, it is the object of the appended s to cover all such variations and modifications as come within the true spirit and scope of the invention.

We claim:

1. A method for determining a pose of an object in a scene, comprising a processor for performing steps of the method, comprising the steps of:
   generating sets of virtual images of a model of the object, wherein each set of virtual images is for a different known pose the model, and wherein the model is illuminated by a set of virtual light sources, and wherein there is one virtual image for each virtual light source in a particular set for a particular known pose;
   constructing virtual depth edges for each virtual image;
   acquiring a set of real images of the object in the scene, wherein the object has an unknown pose, and wherein the object is illuminated by a set of real light sources, and wherein there is one real image for each real light source;
   constructing real depth edges for each real image; and
   comparing the real depth edges for the set of real images with the virtual depth edges of each set of virtual images using a cost function to determine the known pose that best matches the unknown pose.

2. The method of claim 1, wherein the scene includes a plurality of the objects having different unknown poses.

3. The method of claim 2, wherein the plurality of the objects are different and commingled, and further comprising:
   generating the sets of virtual images of the model of each different object.

4. The method of claim 1, further comprising:
   storing the virtual depth edges in a database.

5. The method of claim 1, wherein the pose includes a location and an orientation.

6. The method 1, further comprising:
   generating an ambient lighting image for each set of real images; and
   subtracting the ambient lighting image from each real image.

7. The method of claim 1, wherein a number and locations of the set of virtual light sources and set of real light sources correspond.

8. The method of claim 1, wherein the set of real images is acquired by a camera arranged in a workspace, and further comprising:
   picking the object by a robot arm according to the known pose.

9. The method of claim 1, wherein constructing the depth edges further comprises:
   constructing an intrinsic image $I_{max}$ from the set of real image, wherein each pixel in the intrinsic image stores a maximum intensity selected from corresponding pixels at the same location in all of the real images $I_i$ in the set;
   constructing a ratio image$_{ratio}$ for each real image as $$\frac{I_i}{I_{max}},$$

wherein the ratio images includes the depth edges with an orientation corresponding depends on a direction of the illumination.

10. The method of claim 9, further comprising:
    constructing a distance image from the edges of each ratio image, wherein the comparing is according to chamfer distances in the distance images.

11. The method of claim 1, wherein the cost function is $$C_{i,p}(x, y) = \sum_{u=-Nx/2}^{u=Nx/2} \sum_{v=-Ny/2}^{v=Ny/2} d_i^p(u, v)' d_i^s(x - u, y - v),$$

where (x, y) denotes a location of a particular pixel, Nx, Ny denote a size of the depth edge, u, v denote the coordinates of the depth edge, and $d^p_i$ and dsi respectively represent distance transforms for the virtual and real depth edges for the ith illumination direction 12. The method of claim 1, further comprising:
    evaluating the cost function using a downhill simplex procedure.

13. A system for determining a pose of an object in a scene, comprising:
    a rendering engine configured to generate sets of virtual images of a model of the object, wherein each set of virtual images is for a different possible known pose the model, and wherein the model is illuminated by a set of virtual light sources, and wherein there is one virtual image for each virtual light source in a particular set for a particular known pose;
    means for constructing virtual depth edges for each virtual image;
    a camera configured to acquire a set of real images of the object, wherein the object has an unknown pose, and wherein the object is illuminated by a set of real light sources, and wherein there is one real image for each real light source;
    means for constructing real depth edges for each real image; and
    means for comparing the real depth edges for the set of real images with the virtual depth edges of each set of virtual images using a cost function to determine the known pose that best matches the unknown pose.

* * * * *